A. P. ARMINGTON.
FRICTION DRIVE.
APPLICATION FILED SEPT. 11, 1916.

1,305,866.

Patented June 3, 1919.
4 SHEETS—SHEET 1.

Inventor:
Arthur P. Armington
By Hull, Smith, Brock +West
Atty's.

A. P. ARMINGTON.
FRICTION DRIVE.
APPLICATION FILED SEPT. 11, 1916.

1,305,866.

Patented June 3, 1919.
4 SHEETS—SHEET 2.

Inventor.
Arthur P. Armington
By Hull, Smith, Brock & West
Atty's

A. P. ARMINGTON.
FRICTION DRIVE.
APPLICATION FILED SEPT. 11, 1916.

1,305,866.

Patented June 3, 1919.
4 SHEETS—SHEET 3.

Inventor
Arthur P. Armington
By Hull, Smith, Brock & West
Atty's.

A. P. ARMINGTON.
FRICTION DRIVE.
APPLICATION FILED SEPT. 11, 1916.

1,305,866.

Patented June 3, 1919.
4 SHEETS—SHEET 4.

Inventor,
Arthur P. Armington
By Hull, Smith, Brock & West
Attys.

UNITED STATES PATENT OFFICE.

ARTHUR P. ARMINGTON, OF WICKLIFFE, OHIO.

FRICTION-DRIVE.

1,305,866.  Specification of Letters Patent. Patented June 3, 1919.

Application filed September 11, 1916. Serial No. 119,359.

*To all whom it may concern:*

Be it known that I, ARTHUR P. ARMINGTON, a citizen of the United States, residing at Wickliffe, in the county of Lake and State of Ohio, have invented a certain new and useful Improvement in Friction-Drives, of which the following is a full, clear, and exact description, reference being had to the accompanying drawings.

This invention relates generally to farm tractors, and more particularly to one having a friction drive between the motor and gearing and also one in which the power can be shifted from the traction mechanism and transmitted to a power pulley for the purpose of operating farm machinery or appliances.

The object of the invention is to provide an exceedingly simple and compact mechanism which can be quickly and easily attached to and detached from the frame, and another object of the invention is to provide an oil tight casing for enveloping the operating mechanism thereby protecting and lubricating the mechanism and at the same time rendering the device much safer when operated as a stationary power plant for operating farm machinery.

With these and certain other objects in view which will appear as the description proceeds the invention consists in the novel features of construction and arrangement all of which will be fully described hereinafter and pointed out in the claims.

Figure 1:
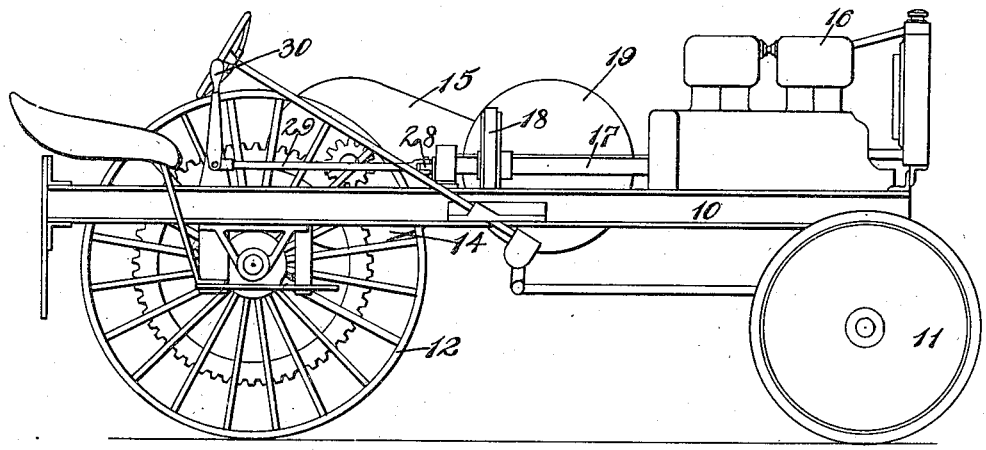
Figure 2:
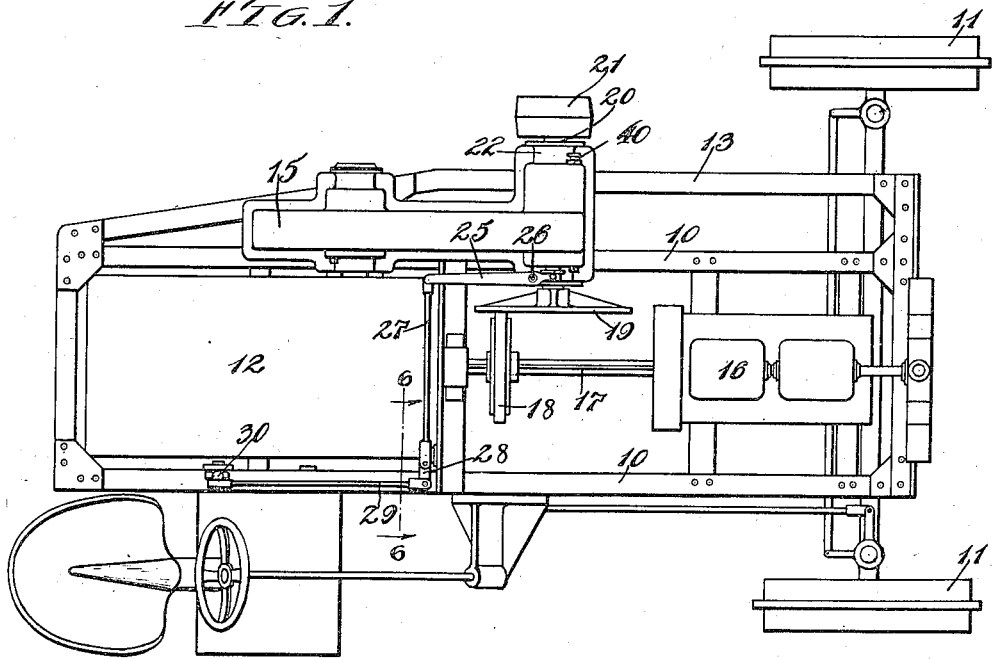
Figure 3:
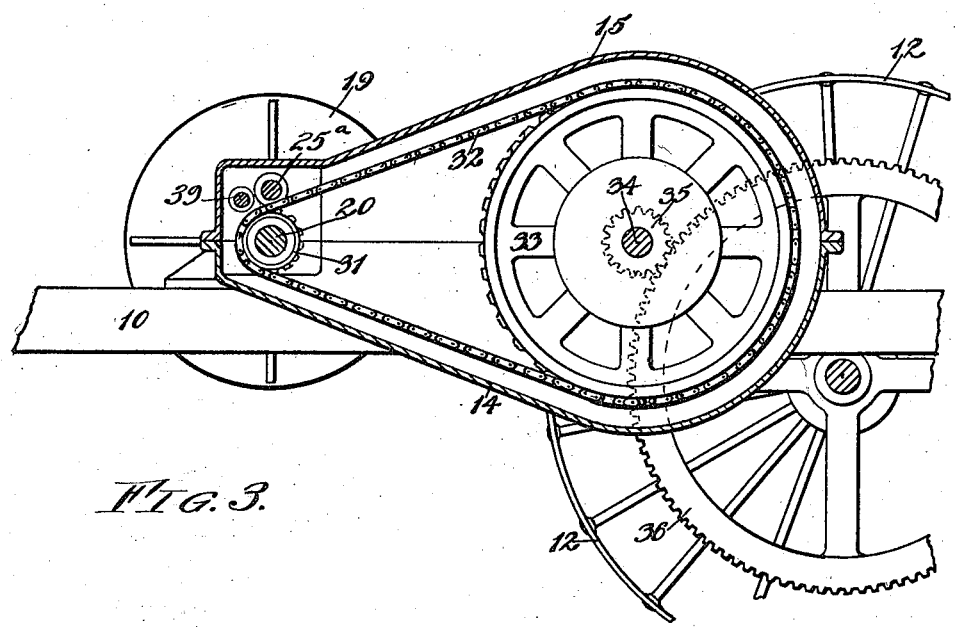
Figure 4:
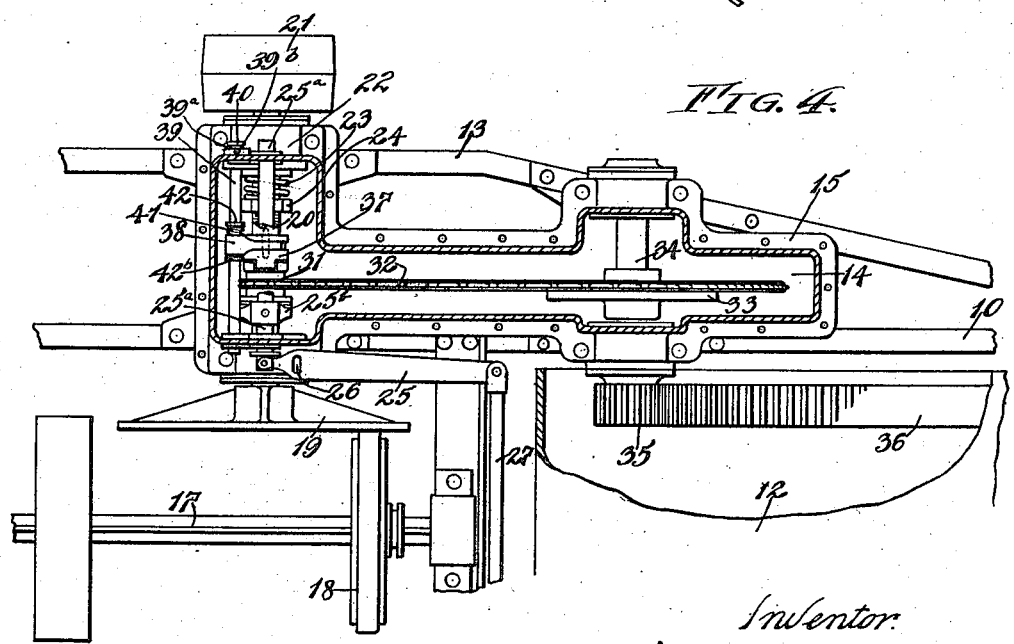
Figure 5:
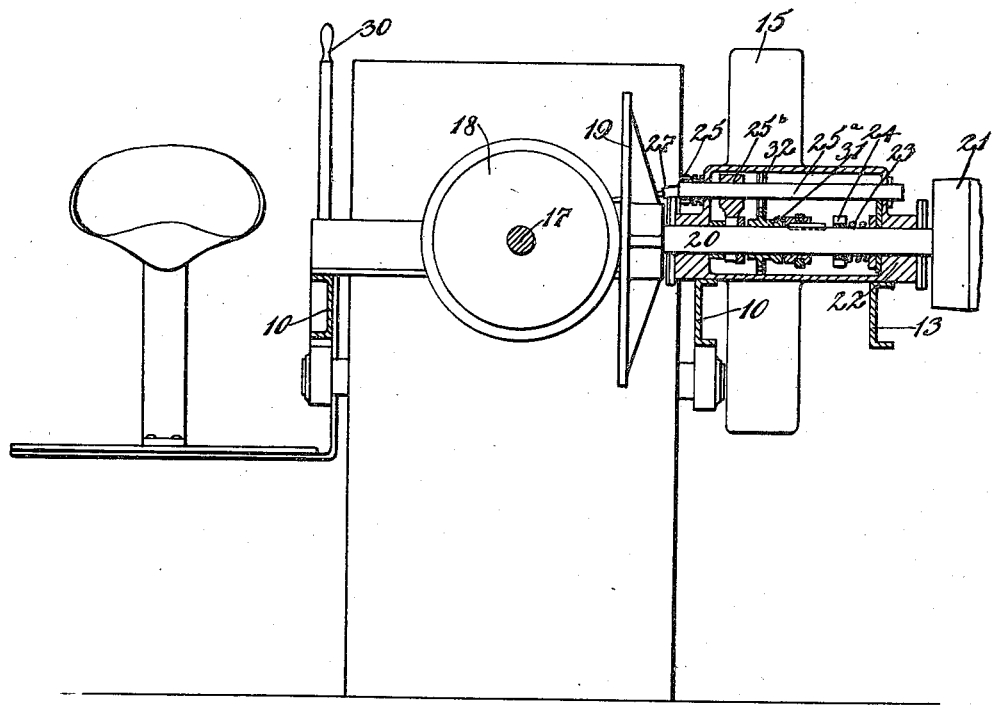
Figure 6:
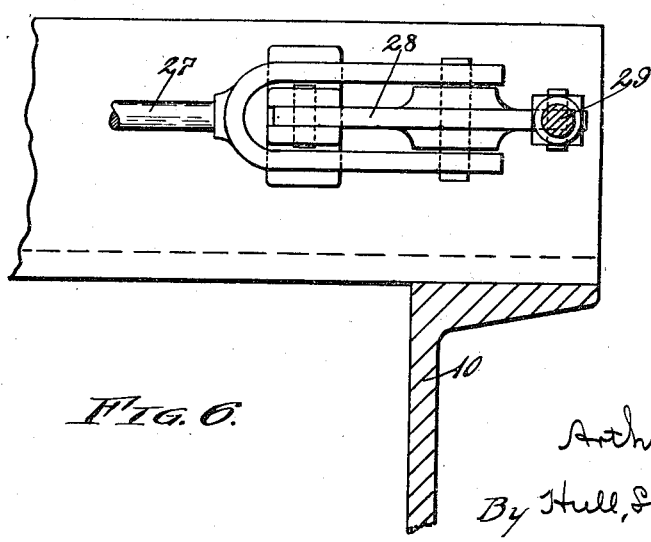
Figure 7:
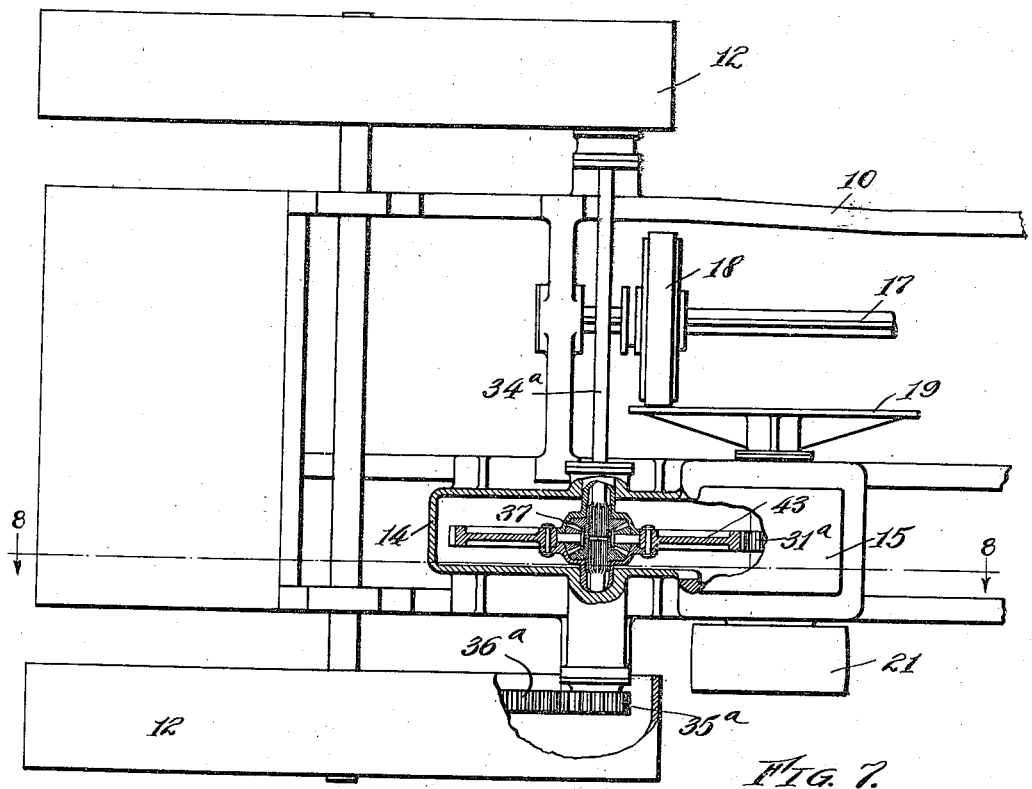
Figure 8:
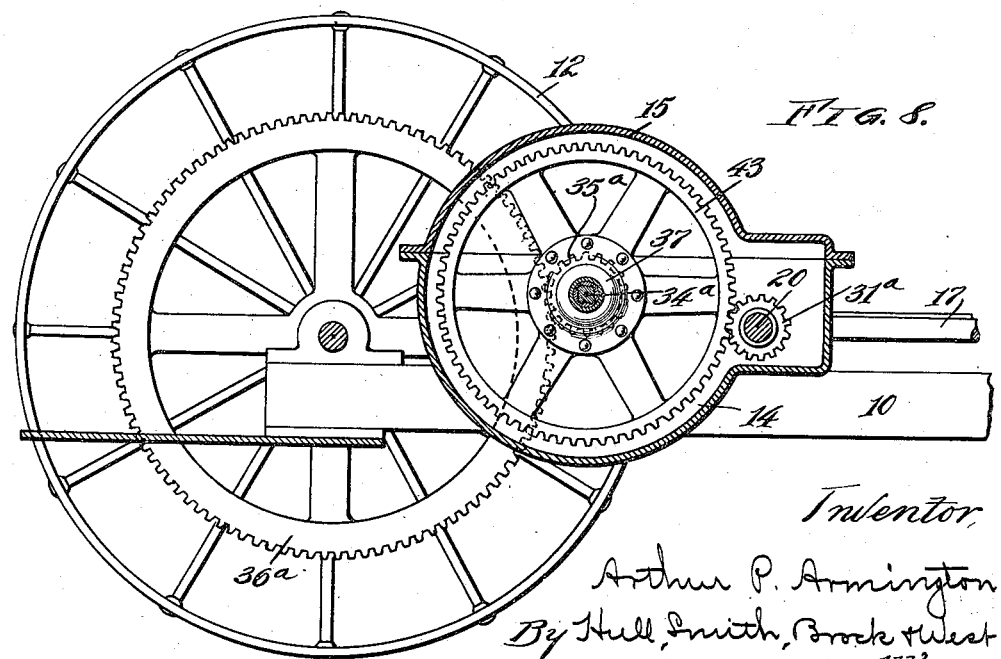

In the drawings forming a part of this specification Figure 1 is a side view of a tractor constructed in accordance with my invention; Fig. 2 is a top plan view of the same; Fig. 3 is a detail sectional elevation illustrating the chain drive of the tractor; Fig. 4 is a detailed sectional plan illustrating the friction drive and means for throwing the tractor and power pulley in and out of gear; Fig. 5 is a sectional view of the shifting mechanism; Fig. 6 is a detail sectional elevation on the line 6—6 of Fig. 2; Fig. 7 is a sectional plan of a modification showing differential for rear wheels; and Fig. 8 is a section on the line 8—8 of Fig. 7.

Referring to the drawings 10 indicates a frame supported at the forward end by the front wheels 11 and at the rear by the tractor wheel 12 but it will be understood that four wheels can be employed instead of three if preferred in which event a differential mechanism will be employed as shown in Fig. 7. The forward wheels 11 are mounted upon stub axles connected to knuckles and operated from a steering wheel in the usual and well known manner. The frame 10 is provided with an extension 13 upon one side thereof and securely fastened to the side of the frame and this extension is the lower half of a casing 14 which with the upper half 15 is adapted to contain the means or mechanism for throwing the device into or out of gear and whereby the power of the motor can be utilized either for operating the device as a tractor or as a stationary power plant for farm purposes. This casing can be made in one piece or can be made sectionally vertical as well as horizontal.

16 indicates the motor which may be of any approved type and 17 an extension of the motor shaft, this shaft having a friction wheel 18 arranged thereon, the motor shaft being provided with a keyway or spline so that the friction wheel 18 can be shifted back and forth by any suitable shifting means. This friction wheel 18 contacts with and drives the friction disk 19 and it is obvious that by moving the friction wheel toward or away from the center of the disk variable speeds and powers can be obtained, and by moving the same from one side of the center to the other the tractor can be made to move in either direction desired. The friction disk 19 is mounted upon the inner end of a power shaft 20 and upon the outer end of said shaft is the power pulley 21. The bearings 22 for the shaft 20 are preferably made integral with the upper and lower sections of the casings 14 and 15 respectively, which being firmly connected to the main frame all of the parts contained therein will be maintained in perfect alinement during all the operations of the device.

The friction disk is normally held in contact with the friction wheel through the medium of a coil spring 23 which surrounds the shaft and bears at one end against the bearing or side of the casing and at the other end upon an apertured nut 24 fastened upon the shaft and any suitable construction of anti friction devices may be employed in connection with said casing, nut and spring to reduce friction.

For the purpose of withdrawing the friction disk from contact with the friction wheel I employ a lever 25 connected to the end of a rod 25ª carrying a fork 25ᵇ engaging a collar connected to the shaft 20 so that when the lever 25 is shifted the power shaft 20 will be forced back against the tension of the spring 23 and the disk carried away from the friction wheel. This lever 25 is in turn connected to a rod 27 which is forked and connects to a yoke 28 pivoted to the frame and connected to a rod 29 operated by the hand lever 30. By pushing forwardly upon this hand lever 30 the rod 29 will be pulled rearwardly operating upon the yoke 28 and rod 27 as before described withdrawing the friction disk out of contact with the friction wheel. Any other system of levers for operating lever 25 may be used.

The shaft 20 has a sprocket 31 loose thereon and around which passes the sprocket chain 32, this chain passing also around a sprocket wheel 33 mounted upon the shaft 34 journaled in bearings integral with the casing and carrying a pinion 35 at its inner end and which engages with the toothed ring 36 connected to the tractor wheel 12 as most clearly shown.

The hub of the sprocket 31 has jaws for engagement with a jaw clutch 37 which is keyed upon the shaft 20 and is movable longitudinally in order to throw the sprocket pulley into or out of operation by means of a fork 38 connected to a rod 39 mounted in the casing and having a longitudinal movement sufficient to shift the clutch in or out, this rod being provided at its outer end with a knob 40 by means of which the rod can be shifted by hand. Any suitable system of lever for operating this rod from the tractor seat may be used. The rod 39 is shifted to disengage the clutch when it is desired to use the power pulley 21 for driving farm machinery, this serving to disconnect the power from the tractor wheel by leaving the sprocket hub loose upon the shaft 20 and if preferred the projecting end of the rod 39 can be provided with two transverse openings either of which may be moved to a position coinciding with an open in the boss 39$^b$ through which a pin can be passed for the purpose of securely holding the rod in its adjusted positions.

A coil spring 41 is arranged upon the rod 39 and bears at one end upon the fork 38 and at the other end against a collar 42 connected to the rod, the purpose of this spring being to hold the clutch 37 and sprocket hub 31 in contact when these parts are in operative relation and when the friction disk is moved longitudinally for engaging and disengaging the friction wheel. In disengaging the jaw clutch a collar 42$^b$ fixed on the rod 39 bears against the fork 38.

In Fig. 7 I have shown two tractor wheels instead of one, and in this construction each wheel is of course provided with the toothed ring 36$^a$ which is engaged by the pinion 35$^a$ mounted upon the ends of the jack shafts 34$^a$ which in turn are connected at their inner ends with the usual construction of differential 37 provided with a spur gear 43 which meshes with a pinion 31$^a$ which is employed in lieu of the sprocket 31 of the single wheel tractor, this pinion being arranged upon the driven shaft 20.

It will thus be seen that I provide an exceedingly simple and highly efficient construction of operating mechanism for farm tractors and in which the power can be utilized either for transporting the tractor or driving farm machinery with the tractor as a stationary power plant. The compactness of the mechanism and all contained within a casing so that it can be attached and detached as a unit is also a highly advantageous feature of construction.

Having thus described my invention, what I claim is:—

1. The combination with a main frame and a supplemental frame attached to the main frame at one side thereof, of a casing attached to said frames, a shaft mounted in said casing and having a friction disk upon one end and a pulley upon the opposite end, said disk and pulley being without the case, a second shaft journaled within the casing, means connecting said shaft, together with means contained within the casing for throwing the first mentioned shaft into and out of operative relation to the second shaft.

2. The combination with a main frame and a supplemental frame attached to the main frame at one side thereof, of a casing attached thereto, a shaft journaled in said casing, a friction disk upon one end of shaft and a pulley upon the opposite end, a sprocket and clutch upon said shaft within the casing, and means for throwing the clutch into and out of engagement with said sprocket, a second shaft in said casing carrying a sprocket and a chain passing over said sprockets.

3. In a device of the kind described, a main frame, and a supplemental frame attached to the main frame at one side thereof a casing rigidly connected to said frames, a power shaft journaled in said casing, the ends thereof projecting through the opposite sides of said casing, a friction disk upon one end of said power shaft and a power pulley upon the opposite end, a motor upon the frame, a motor shaft and a friction wheel shiftable thereon and adapted to engage the friction disk upon the end of the power shaft, a tractor wheel or wheels, means connecting the power shaft and tractor wheel together with means for throwing the tractor wheel out of gear with the power shaft, and also means for throwing the power shaft out of gear with the motor shaft.

4. In a device of the kind described, the combination with a main frame and a supplemental frame attached to the main frame at one side thereof, a casing rigidly connected thereto, a power shaft journaled in said casing, the end of said shaft projecting beyond the casing, a friction disk upon one end of said shaft and a power pulley upon the opposite end of said shaft, a sprocket hub and clutch upon said power shaft, means for operating said clutch, a sprocket wheel and shaft mounted also in the casing, a tractor wheel, and toothed ring connected thereto and a pinion carried by the sprocket shaft and engaging said toothed ring.

5. In a device of the kind described, the combination with a casing, of a power shaft journaled therein and having a friction disk upon one end and a power pulley upon the opposite end, a shaft journaled in the casing and parallel with the power shaft and having a sprocket wheel arranged thereon intermediate its ends and a pinion upon one end, a sprocket hub arranged upon the power shaft, a sprocket chain passing around said hub and sprocket wheel, a clutch upon the power shaft adapted to engage the sprocket hub, a shifting rod and fork connected therewith for disengaging the clutch from the sprocket hub together with means for shifting the power shaft longitudinally for the purpose set forth.

6. The combination with a casing, of a power shaft journaled therein, a friction disk upon one end of the shaft and a power pulley upon the opposite end, means for shifting said power shaft, and power transmitting devices arranged in said casing one of said devices being upon said power shaft, and means carried by said power shaft to throw said transmitting device into or out of operation.

In testimony whereof, I hereunto affix my signature.

ARTHUR P. ARMINGTON.